No. 666,907. Patented Jan. 29, 1901.
H. PIERPOINT.
APPARATUS FOR DISPLAYING ADVERTISEMENTS, &c.
(Application filed July 24, 1899.)
(No Model.) 4 Sheets—Sheet 1.

WITNESSES
E. Howard.
Joseph Bates.

INVENTOR
H. Pierpoint

No. 666,907. Patented Jan. 29, 1901.
H. PIERPOINT.
APPARATUS FOR DISPLAYING ADVERTISEMENTS, &c.
(Application filed July 24, 1899.)
(No Model.) 4 Sheets—Sheet 2.

WITNESSES.
E. Howard.
Joseph Bates.

INVENTOR
H Pierpoint

No. 666,907. Patented Jan. 29, 1901.
H. PIERPOINT.
APPARATUS FOR DISPLAYING ADVERTISEMENTS, &c.
(Application filed July 24, 1899.)
(No Model.) 4 Sheets—Sheet 3.

WITNESSES.
E. Howard.
Joseph Bates.

INVENTOR
H. Pierpoint
by J. O'Walter O'Brien
atty

UNITED STATES PATENT OFFICE.

HERBERT PIERPOINT, OF WARRINGTON, ENGLAND.

APPARATUS FOR DISPLAYING ADVERTISEMENTS, &c.

SPECIFICATION forming part of Letters Patent No. 666,907, dated January 29, 1901.

Application filed July 24, 1899. Serial No. 724,990. (No model.)

*To all whom it may concern:*

Be it known that I, HERBERT PIERPOINT, a subject of the Queen of Great Britain, residing at Warrington, in the county of Lancaster, England, have invented certain new and useful Improvements in Apparatus for Displaying Advertisements or other Images, of which the following is a specification.

This invention relates to optical and other apparatus, chiefly for advertising purposes, designed for the purpose of exhibiting or displaying legible characters upon a screen (or the like) progressively and then obscuring them. As applied to a sign comprising one or more words each letter would be displayed successively and then the full name or names be obscured.

It comprises a disk or part of a disk or plate forming a shield pivoted to rotate of scroll shape, or with steps, notches, slits, or the like cut in its periphery, or formed by making part of shield opaque and part transparent, or by two or more contrasting colors which when rotated or moved to and fro will progressively expose the image to produce the effect of writing applied to the letters of a word or name.

The invention will be fully described with reference to the accompanying drawings.

Figure 1:
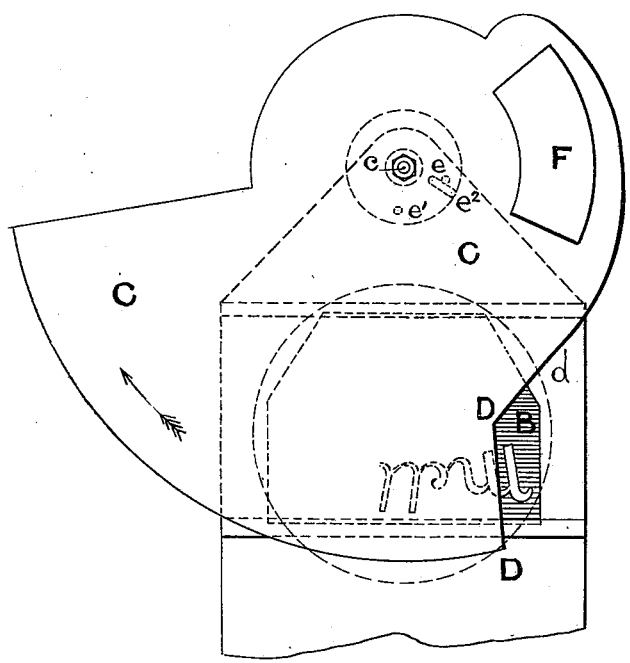
Figure 2:
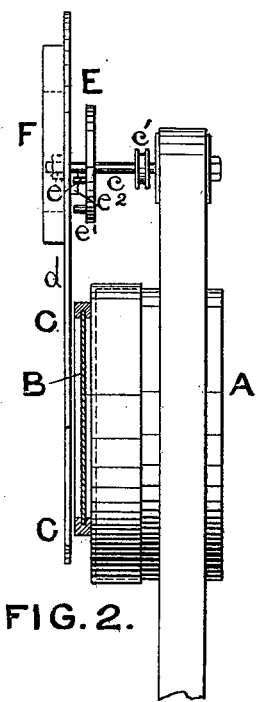
Figure 3:
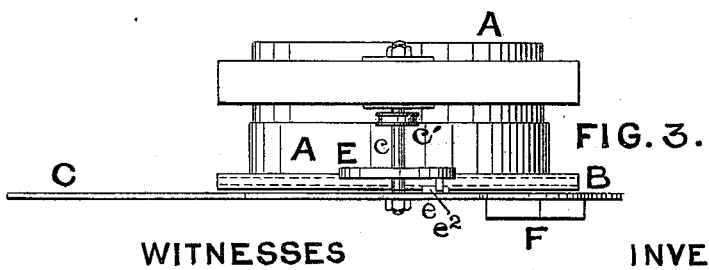
Figure 6:
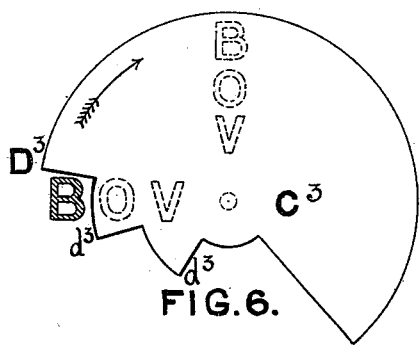
Figure 7:
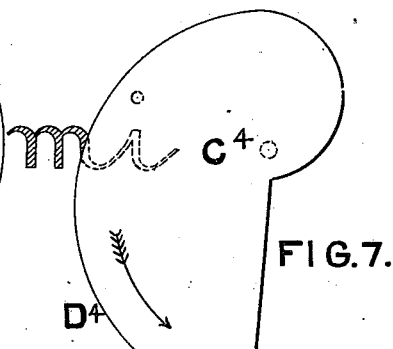
Figure 4:
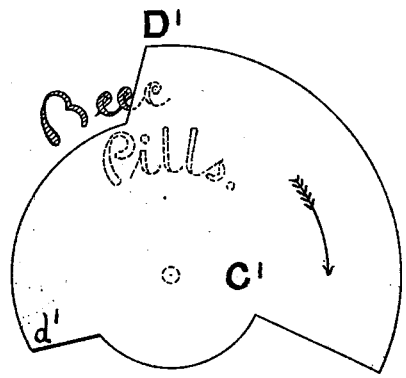
Figure 5:
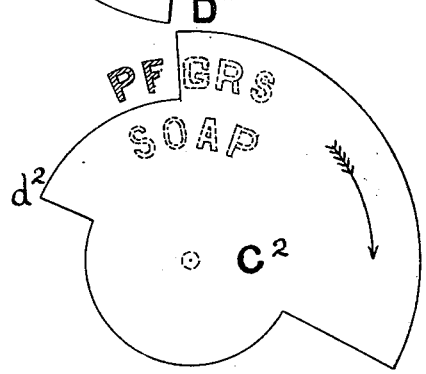
Figure 8:
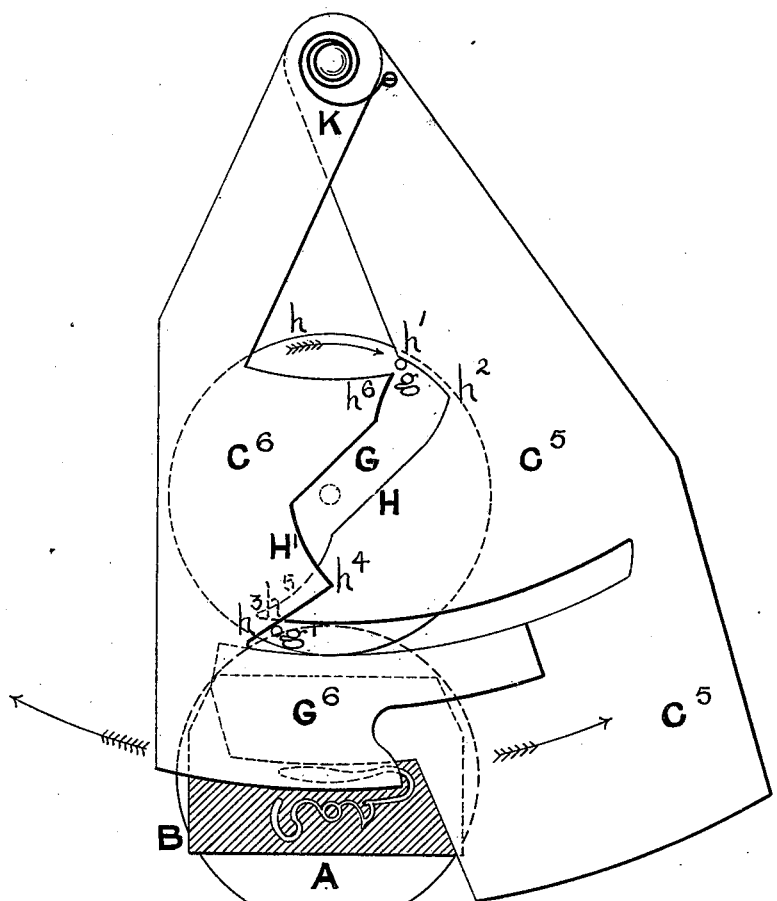
Figure 9:
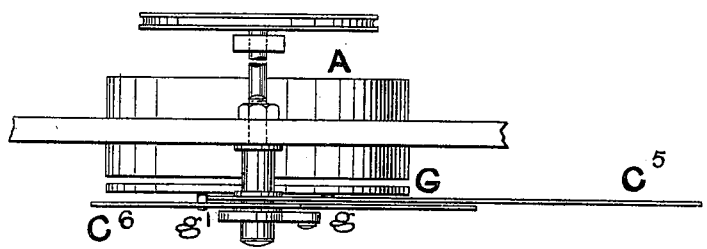
Figure 10:
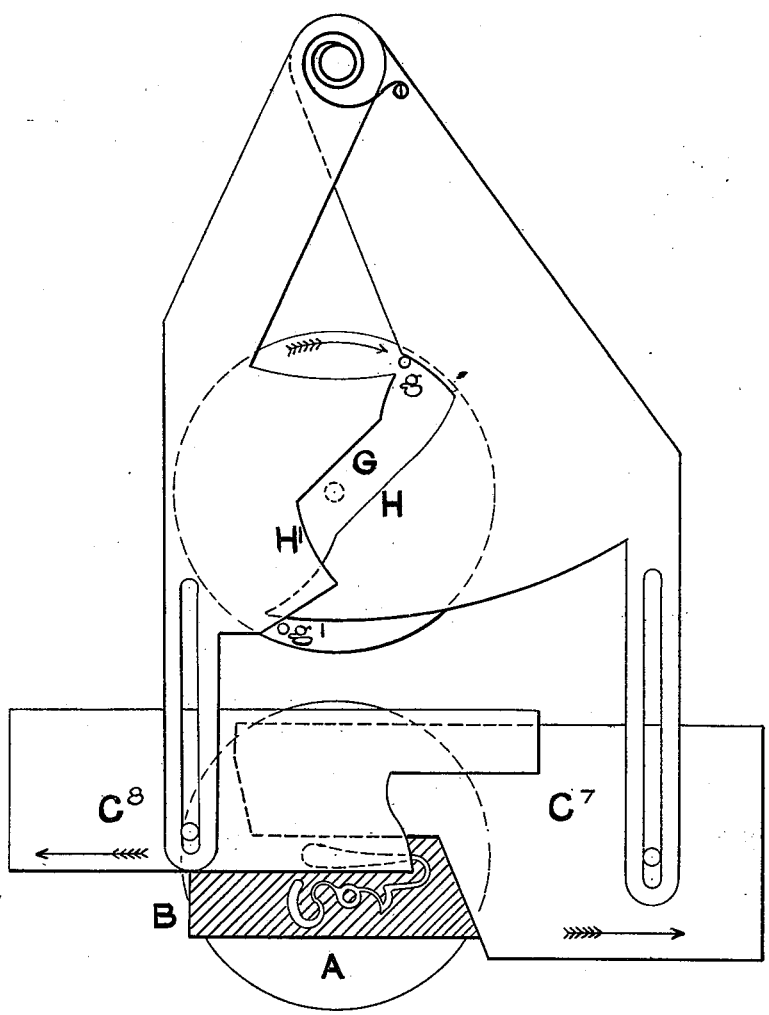

Figure 1 is a front elevation of the apparatus; Fig. 2, a side elevation of same; Fig. 3, a plan of same; Fig. 4, a front elevation of modified form of shield; Fig. 5, a front elevation of another modification; Figs. 6 and 7, front elevations of other modifications of the shield; Fig. 8, a front elevation of a further modification of the apparatus; Fig. 9, a plan of same, Fig. 8; Fig. 10, a front elevation of another modification.

In the drawings, A is the condenser of a lens, and B a lettered screen, which may be arranged in any suitable way, or the lettered screen may be employed with suitable lighting arranged without a condenser or lens.

In front of the screen (or behind it, if desired) is placed a shield C, mounted on a pivot or spindle $c$ and driven by a band-pulley $c'$ or otherwise to rotate or move backward and forward. The shield C is shaped along the edge D to progressively disclose the letters, so as to give the effect of writing thereto. The edge D of the shield C is stepped in any desired graduation of steps, the face of such being inclined at such an angle as will give the desired effect. The shield C is rotated by a pin-wheel E on the shaft or spindle $c$ with two projecting pins $e$ $e'$. The pin $e$ on the wheel E engages with a projection $e^2$ on the back of the disk C and carries the disk slowly around with it. When the disk-plate C has completed about half its revolution, it falls quickly forward of its own gravity to obscure the image, the second pin $e'$ acting as a stop against which the projection $e^2$ falls. F is a counterbalance-weight. The shield may be of any shape and may move in either direction, or two disk plates or shields may work together, one behind the other, which come into operation successively to expose the lettering on the screen B in any desired order, either backward or forward.

Referring to Figs. 1, 2, and 3, the shield C is provided with an inclined edge D, which as the shield rotates progressively exposes the word, first the downstrokes and then the upstrokes to give the effect of writing. The scroll-shaped part $d$ of the edge of the shield C subsequently progressively displays the tail of the last letter.

Referring to Fig. 4, shield C' is formed with an inclined edge D' and a second step and inclined edge $d'$ to progressively expose two lines of written words.

Referring to Fig. 5, the shield C² is formed with an inclined edge D² and a second step and inclined edge $d^2$ to progressively expose two lines of printed words.

Referring to Fig. 6, the shield C³ is formed with an inclined edge D³ and a plurality of steps and edges $d^3$, one for each letter, to successively expose letters set radial to the center upon which the shield rotates.

Referring to Fig. 7, the shield C⁴ is formed with a scroll or cam-shaped edge D⁴ to progressively expose the written words.

Referring to Figs. 8 and 9, two shields are employed to move or operate in different directions. The two shields C⁵ and C⁶ are actuated by pins $g$ $g'$ on the wheel G, rotated in the direction of the arrow, and the pins engaging with the face or edge H H' of the shields alternately move first one and then the other away from the center. The shield C⁶ remains stationary while the shield C⁵ is moved into the position shown in Fig. 8, such movement having been caused by the travel of the pin $g$ along the face or edge H from $h$ to $h'$. The shield $C^5$ then remains stationary while the pin $g$ travels from $h'$ to $h^2$, and at the same time the shield $C^6$ is caused to move by the action of the pin $g'$ on the face or edge $H'$ from $h^3$ to $h^4$. The two shields then continue to be moved outward until the pin $g$ has traversed the whole of the face or edge H and reached the point $h^5$ and the pin $g'$ has traversed the whole of the face or edge $H'$ and reached the point $h^6$. The two shields $C^5$ $C^6$ then fall sharply back of their own gravity or assisted by the spring K to obscure the image. The lower edges of the shields $C^5$ $C^6$ may be stepped or shaped to give the desired effect.

Referring to Fig. 10, the shields $C^7$ and $C^8$ may be formed separate from the upper parts thereof and be connected by a pivoted connection, so that the lower parts $C^7$ and $C^8$ will slide in a rectilinear path.

Either of these forms of shield may be used with a projector or search-light to direct the rays of light onto a fixed sign, or they may be employed where light falls upon instead of being projected through the screen B to give a non-illuminated effect.

What I claim as my invention, and desire to protect by Letters Patent, is—

1. Apparatus for displaying names in which each letter is progressively displayed with the form of motion comprising in its construction a shaped shield provided with edges correlatively placed in relation to the letters to progressively expose them a lettered screen and rotary mechanism for operating the said shield substantially as described.

2. In apparatus for progressively displaying letters with the effect or appearance of writing the combination with a lettered screen of a rotating shield provided with shaped edges which progressively expose and disclose the letters and indicate writing substantially as described.

3. In apparatus for progressively displaying advertisements with the effect of writing the combination of a lettered screen comprising a written character or name and a rotating shield having the edge formed in inclined steps to progressively expose the letters of the word and quickly obscure them and mechanism for actuating the shield substantially as described.

In witness whereof I have hereunto signed my name in the presence of two subscribing witnesses.

HERBERT PIERPOINT.

Witnesses:
   J. OWDEN O'BRIEN,
   B. LATHAM WOODHEAD.